Patented Apr. 15, 1947

2,419,051

UNITED STATES PATENT OFFICE 2,419,051

HYDROLYSIS OF ACETONE AUTO-CONDENSATION PRODUCTS

Seaver A. Ballard, Oakland, and Vernon E. Haury, El Cerrito, Calif., assignors to Shell Development Company, San Francisco, Calif., a corporation of Delaware No Drawing. Application December 5, 1944, Serial No. 566,782

6 Claims. (Cl. 260—586)

This invention relates to a process for the hydrolysis of acetone auto-condensation products. More particularly, the invention pertains to a method for effecting hydrolysis of xylitone and higher acetone auto-condensation products to isophorone and acetone.

Isophorone is a valuable organic compound which is manufactured in commercial quantities by auto-condensation of acetone. Numerous methods and techniques for preparing isophorone from acetone have been described. For example, U. S. Patent No. 2,183,127 shows contacting acetone vapors at 350° C. to 400° C. with calcium carbide, calcium oxide or calcium hydroxide, whereby isophorone is produced. Copending application Serial No. 474,060, filed January 28, 1943, describes producing isophorone by continuously contacting acetone in liquid phase at 130° C. to 235° C. with a dilute aqueous solution of an alkali metal hydroxide like sodium or potassium hydroxide while continuously withdrawing the organic phase. In this method, the water formed by the reaction is extracted by the effluent organic phase and the concentration of hydroxide in the aqueous catalyst solution is maintained substantially constant. Isophorone is formed from acetone in the application of these methods by auto-condensation or chemical combination of three molecules of acetone so as to give one molecule of isophorone and two molecules of water. However, in all the methods, the formation of isophorone from acetone is not the single reaction which occurs; in fact, a multiplicity of reactions take place and this multiplicity of reactions always produces a series of related compounds. Thus the total product obtained in the auto-condensation of acetone to form isophorone contains a mixture of unreacted acetone, mesityl oxide, diacetone alcohol, isophorone, xylitone and other higher ketones of the formulas $C_{15}H_{22}O$, $C_{18}H_{30}O$, $C_{24}H_{34}O$, etc., as well as very minor amounts of products like phorone and mesitylene. The formation of these various products other than the desired isophorone constitutes a loss of yield of isophorone and is of serious proportion in commercial application of acetone condensation processes. Now the by-products mesityl oxide and diacetone alcohol are commercially valuable as such and can be separated from the total product by distillation. However, if desired, they can be isolated by fractional distillation and separately subjected to treatment whereby they are reconverted to acetone which can be returned to the isophorone synthesis. Thus Harries, Ber. 32, 1328 (1899), describes a method for hydrolyzing mesityl oxide to acetone and Koelichen, Zeit. Physik. Chem. 33, 129 (1900), reports a method of reverting diacetone alcohol to acetone. These methods of separate treatment require a number of fractionation steps and separate treatments in order to revert the mesityl oxide and diacetone alcohol to acetone. A superior procedure is described in U. S. Patent No. 2,351,352. According to this method, the total product is distilled so as to obtain a fraction consisting of isophorone and lower-boiling materials and another fraction consisting of compounds higher boiling than isophorone. The crude fraction containing the isophorone and lower-boiling materials is then treated so as to selectively revert substantially all of the mesityl oxide, diacetone alcohol and phorone contained therein to acetone without appreciable change of the isophorone. This procedure avoids several of the fractionation steps and improves the efficiency. Another method to avoid formation of lower-boiling by-products like mesityl oxide and diacetone alcohol is to recirculate these compounds along with the acetone fed to the reaction system described in the above-indicated copending application, whereby the reaction mixture is maintained in a steady state of chemical balance with respect to the compounds. This method is described in U. S. Patent No. 2,344,226.

While these various procedures are satisfactory for disposing of the problem of by-products lower boiling than isophorone in methods of manufacturing isophorone from acetone, no process has heretofore been proposed which enables satisfactory disposal of the by-products which are higher boiling than isophorone. Such higher-boiling by-products are always obtained in appreciable quantities. For example, in producing isophorone according to the method of copending application Serial No. 474,060, the material produced consisting of isophorone and higher-boiling by-products contains 70% to 85% isophorone and the remaining 15% to 30% is acetone auto-condensation products which are higher boiling than the isophorone. Since the by-products of lower boiling point than isophorone can be substantially completely reverted to acetone by the above-indicated methods, the yield of isophorone from acetone prior to the present invention was limited to 70% to 85%.

We have now discovered a process for treating the by-product acetone auto-condensation products of higher boiling point than isophorone so as to enable a still higher yield of isophorone to be realized. According to the method of the invention, the ketone by-products obtained in auto-condensing acetone to isophorone, which by-products are substantially free of isophorone and lower-boiling by-product ketones, are contacted with an aqueous solution containing about 0.5% to 25% of an alkali metal hydroxide at a temperature of 130° C. to 235° C. Surprisingly, it was found that this treatment of the higher-boiling by-products like xylitone, instead of reverting the by-products back to the parent ketone acetone as is the case in similar treatment of phorone or mesityl oxide, caused the higher-boiling by-products to hydrolyze into isophorone as well as acetone. In other words, instead of the by-product ketones like xylitone being reconverted so that acetone was the sole end product, the treatment split the by-product ketones so that both isophorone and acetone were obtained rather than just acetone alone.

It is essential in applying the process of the invention that the material treated be xylitone and acetone auto-condensation products higher boiling than xylitone, which material is substantially free of lower-boiling ketones. By substantially free is meant that the material contain no more than about 10% of isophorone and still lower-boiling ketones. This can be made more evident from the following considerations. When acetone is treated with an aqueous solution of an alkali metal hydroxide at an elevated temperature, xylitone and higher-boiling by-product ketones are formed and present in the reaction mixture, and it might be expected that the hydrolysis to isophorone and acetone would occur in situ. Such, however, is not the case because, upon fractionation of the crude product so as to separate isophorone and lower-boiling components in the mixture, the fraction obtained which is of higher boiling point than isophorone hydrolyzes to isophorone and acetone when treated according to the method of the invention even though it is entirely free of these compounds before the treatment. Likewise, when the entire crude product from the isophorone synthesis containing substantial amounts of isophorone and lower boiling constituents is treated, no appreciable hydrolysis of the xylitone and higher-boiling ketones to isophorone and acetone occurs when it is subjected to the treatment of the present invention. In order to realize the desired hydrolysis reaction which occurs in the process of the invention, it is necessary that the material treated be substantially free of acetone condensation products of lower boiling point than xylitone and that it contain no more than about 10% of isophorone. Preferably the material treated is free of products of lower boiling point than isophorone and contains no more than 5% isophorone.

The foregoing facts will become clear by consideration of the following tests.

Acetone was subjected to auto-condensation by contacting it with an aqueous solution of potassium hydroxide. A system was used wherein acetone was continuously fed into a reaction zone along with the catalyst solution and the acetone was intimately commingled and churned with the catalyst solution in the reaction zone. The mixture was continuously withdrawn to a separator where stratification of the reaction mixture occurred. The aqueous catalyst layer was recycled to the reaction zone while the organic layer consisting of unreacted acetone and the formed auto-condensation products was removed from the separator. Sufficiently high pressure was maintained on the reaction system so that no materials therein were in vapor phase, and water was introduced with the acetone feed so that the concentration of potassium hydroxide in the catalyst solution was kept constant, the water formed by the reactions along with some additional water being extracted and removed from the system by the effluent organic layer from the separator. The reaction conditions were as follows:

| | |
|---|---:|
| Temperature °C | 170 |
| Pressure p. s. i. | 300 |
| KOH concentration in aqueous solution per cent | 35 |
| Phase ratio or organic layer to aqueous layer | 3.15:1 |
| Contact time in reactor minutes | 14.8 |
| Contact time in separator do | 5.1 |

The composition of the effluent organic layer was approximately as follows:

| | Per cent |
|---|---:|
| Acetone | 76 |
| Diacetone alcohol | 3 |
| Water | 12.3 |
| Mesityl oxide | 4.1 |
| Isophorone | 3.0 |
| Auto-condensation products higher boiling than isophorone | 0.8 |

This material was fed to a continuous distillation column operated under pressure wherein the diacetone alcohol and mesityl oxide in the presence of a dilute solution of potassium hydroxide were converted into acetone which was removed overhead as an azeotropic distillate with water. The reversion of the diacetone alcohol to acetone was complete, while 93% of the mesityl oxide reverted to acetone. The column was operated under the following conditions:

| | |
|---|---:|
| Kettle temperature °C | 143 |
| Head temperature °C | 108 |
| Pressure p. s. i. | 46 |
| Reflux ratio | 1.5:1 |
| KOH concentration in aqueous solution per cent | 1.2 |
| Contact time with catalyst solution hours | 5.4 |

The distillate from the column was of the following composition:

| | Per cent |
|---|---:|
| Acetone | 90.9 |
| Water | 9.1 |

The residue or bottoms from the column had the composition tabulated below:

| | Per cent |
|---|---:|
| Acetone | 0.2 |
| Water | 5.0 |
| Mesityl oxide | 5.6 |
| Isophorone | 72.6 |
| Higher boiling than isophorone | 16.6 |

The residue was distilled for separation of isophorone and components lower boiling than isophorone. The material remaining was substantially free of isophorone and was subjected to hydrolysis by means of an aqueous solution of potassium hydroxide. The hydrolysis was effected in continuous fashion in a turbo mixer reactor consisting of a pressure vessel having an internally rotating paddle wheel and fitted with an internal steam coil to supply the heat needed. The reactor was operated under pressure so as to contain no vapor phase therein. The reaction mixture was continuously withdrawn from the reactor, without separation of organic and aqueous substances at an equal rate to which material treated and catalyst solution were introduced. The conditions maintained in the reactor were as follows:

| | |
|---|---|
| Temperature °C | 200 |
| Pressure p. s. i. | 370 |
| KOH concentration in aqueous solution per cent | 1 |
| Volume ratio of feed to catalyst solution | 1.1 |
| Contact time hours | 1 |

A portion of the product was neutralized with acetic acid and the oily organic layer separated. Both layers were distilled to determine the amount of acetone formed and the residue of the organic layer was then vacuum distilled at 10 mm. pressure. The results of this distillation along with those of a like distillation at 10 mm. pressure on the untreated feed are tabulated below:

| Component or Boiling Range, °C. | Percentage Composition | |
|---|---|---|
| | Feed | Product |
| Acetone | None | 2.5 |
| Isophorone | 2.2 | 12.5 |
| 96–110 | 3.6 | 5.7 |
| 110–115 | 32.3 | 32.7 |
| 115–125 | 6.5 | 4.2 |
| 125–130 | 19.0 | 15.2 |
| 130–143 | 8.4 | 3.3 |
| Bottoms | 27.0 | 22.7 |
| Loss | 1.0 | 1.2 |
| Total | 100.0 | 100.0 |

The treatment effected about 13 weight per cent hydrolysis of the high boiling acetone auto-condensation products.

The above results clearly demonstrate that contacting acetone auto-condensation products which are substantially free of isophorone and constituents lower boiling than isophorone with a dilute aqueous solution of an alkali metal hydroxide at elevated temperature in the liquid phase causes hydrolysis of the product to the more useful compounds isophorone and acetone even though the auto-condensation products had been formed by treatment of acetone in the presence of an aqueous alkali metal solution and the crude product from the auto-condensation that contained a substantial proportion of isophorone had been further contacted with a dilute aqueous solution of an alkali metal hydroxide. The latter treatment of the crude product from the acetone auto-condensation was made under conditions which were especially favorable if the unexpected results of the process of the invention were to be explained simply as an equilibrium phenomenon since in that treatment acetone, one of the hydrolysis products of the reaction of the invention, was continuously removed from the system and the temperature (143° C.) and contact time (5.4 hours) were adequate. Nevertheless, when the isophorone and constituents lower boiling than isophorone were separated from the acetone auto-condensation products and this material was subjected to the described treatment of the invention, hydrolysis so as to form isophorone and acetone occurred.

The material treated according to the process of the invention is a complex series of acetone auto-condensation products. Xylitone, having the formula $C_{12}H_{18}O$, is the first member of the series treated although, as known to those skilled in the art, xylitone is not a unique and single compound; rather, several isomeric compounds are known by this name. The next members of higher molecular weight have no recognized name, but are of the formula $C_{15}H_{22}O$. Still higher members go up the series with the formulas $C_{18}H_{26}O$, $C_{21}H_{30}O$, $C_{24}H_{34}O$, etc. All of these compounds appear to be olefinically unsaturated ketones containing a six-membered carbon ring having the carbonyl group as one of the members of the ring. The material treated is acetone auto-condensation products of the formula $$C_{3n}H_{4n+2}O$$

wherein $n$ is an integer of at least 4 and preferably the material treated consists of at least 95% of compounds of this general formula.

A better understanding of the character of the material treated may be gained by consideration of the following tabulation of data secured by distillation at 10 mm. pressure and by analysis of fractions thereof. The material had been produced by auto-condensation of acetone in liquid phase and at elevated temperature in the presence of an aqueous solution of an alkali metal hydroxide and had been given a previous distillation for removal of isophorone and lower-boiling constituents.

| Fraction | 1 | 2 | 3 | 4 | 5 |
|---|---|---|---|---|---|
| Boiling range at 10 mm., °C | 102–112 | 112–123 | 123–142 | 142–172 | 175 |
| Wt. per cent of charge | 6 | 29 | 38 | 20 | 6 |
| Refractive index (20/D) | | 1.5107 | 1.5178 | 1.5709 | |
| Specific gravity (20/4) | | 0.9284 | 0.9481 | 0.9837 | |
| Mol. wt. (Ebull. in benzene) | | 176 | 196 | 214 | |
| Mol. wt. (Theoretical) | | 178 | 198[1] | 218 | |
| Carbon, per cent | | 80.6 | 80.9 | 80.4 | |
| Hydrogen, per cent | | 10.3 | 10.3 | 10.0 | |
| Probable material | | $C_{12}H_{18}O$ | Mixture $C_{12}H_{18}O$ And $C_{15}H_{22}O$ | $C_{15}H_{22}O$ | |

[1] Assuming equivalent weights of $C_{12}H_{18}O$ and $C_{15}H_{22}O$.

While the present invention is described herein with particular reference to treatment of acetone auto-condensation products obtained by condensing acetone with the aid of an alkali, the process of the invention is equally applicable to material prepared with the use of other catalysts and methods. Reference is had to the acetone auto-condensation products which are substantially free of isophorone and other lower-boiling constituents formed by auto-condensation of acetone with acid catalysts (hydrochloric acid, sulfuric acid, etc.), with vapor phase methods such as described in U. S. Patent No. 2,183,127, as well as with alkaline catalysts like alkali metal and alkaline earth metal hydroxides, sodium alcoholate, calcium carbide, sodium amide, etc. In other words, the particular source of the acetone auto-condensation products treated is not of importance.

The catalyst used in effecting the hydrolysis reaction occurring in the process of the invention is a dilute aqueous solution of an alkali metal hydroxide. The hydroxide can be lithium, sodium, potassium, rubidium, cesium, or mixtures thereof. The use of sodium and potassium hydroxides is preferred with potassium hydroxide being most preferred because of somewhat higher catalytic activity. The concentration of hydroxide contained in the aqueous solution can be from 05% to 25% by weight, although a concentration of 1% to 10% is preferred. Very satisfactory results are obtained with 2% sodium or potassium hydroxide.

The temperature of operation is from about 130° C. to 235° C., 235° C. being the critical temperature of acetone, one of the products of the hydrolysis reaction. Preferably a temperature between 170° C. and 220° C. is used. Sufficient pressure is maintained on the reaction zone at the operating temperature so that the material treated and the catalyst solution are in the liquid phase.

For best results, the choice of conditions employed in the reactor is governed by some judgment. The rate of the hydrolysis reaction is increased both with increased concentrations of hydroxide in aqueous solution and with increased temperature. Equivalent reaction rates can be obtained with the use of hydroxide concentration in the lower part of the above-stated range with temperature in the upper part of the range or vice versa. With both variables in the lower ranges the reaction, although it occurs, is slow, while when both are in the upper range there is a tendency for further undesirable condensation reactions.

The ratio of the volume of material treated to volume of catalyst solution can be varied over wide limits without very large effects in the results. Ratios of volume of material treated to volume of catalyst solution from 5:1 to 1:5 are suitable, and equal volumes of each are particularly satisfactory. Since, however, water is consumed in the hydrolysis reaction which occurs, it is desirable to use a sufficient volume of aqueous catalyst solution so that the solution supplies the water without increasing the catalyst concentration therein beyond 25% or to feed in extra water to the reaction zone to attain the same result.

The time of contact of the organic material with the catalyst solution is another variable of the reaction system which can be adjusted so as to be in balance with the other conditions. Preferably, the contact time or time of residence within the reaction zone is sufficient so that at least 5% hydrolysis occurs.

For the purpose of illustrating the effects of some of these variables, a tabulation of results is given. The material treated was a mixture of acetone auto-condensation products like that for which results of distillation and analyses of fractions was given hereinbefore. It had an average molecular weight of 200 and a value of 4.55 for the equivalent moles of acetone contained therein per mol of material. It, of course, contained no actual acetone, this value being merely convenient for calculating the extent of hydrolysis. It was treated in a batchwise manner in a pressure autoclave. The temperature of treatment was 175° C. under a pressure of about 135 p. s. i. The catalyst was sodium hydroxide and a ratio of about 1.5 volumes of material treated per volume of aqueous catalyst solution was used. In each case, an amount of material treated was used which was equivalent to 205 mols of acetone.

| Time, hours | Percentage NaOH Conc. | Hydrolysis Products in acetone equiv. mols | | | Mols Acetone per mol Isophorone | Mol Percentage Hydrolysis |
|---|---|---|---|---|---|---|
| | | Isophorone | Acetone | Total | | |
| 2 | 2 | 20.7 | 5.5 | 26.2 | 0.80 | 12.8 |
| 4 | 2 | 26.4 | 8.9 | 35.3 | 1.01 | 17.2 |
| 8 | 2 | 33.6 | 10.8 | 44.4 | 0.97 | 21.6 |
| 2 | 4 | 23.2 | 6.4 | 29.6 | 0.83 | 14.4 |
| 2 | 6 | 26.3 | 7.0 | 33.3 | 0.80 | 16.3 |

It will also be noted from the above results that the molecular ratio of acetone to isophorone obtained was approximately one although these were obtained from a material containing a great complexity of individual compounds.

The process of the invention can be executed according to a variety of procedures some of which have been described hereinbefore. It can be accomplished in a batchwise method whereby the acetone auto-condensation products and the aqueous catalyst solution are commingled and mixed in a reactor fitted with a stirring or churning device. Upon completion of the treatment, the contents are discharged from the reactor and the contents distilled to recover the products and unreacted material. Preferably the treatment is effected in a continuous manner wherein the auto-condensation products and catalyst solution are continuously fed to a reactor and a portion of the reaction mixture therein is continuously withdrawn. The withdrawn mixture is allowed to stratify into two layers and the aqueous catalyst layer is recycled to the reactor. In such cases, the conditions may be such that it is desirable to continuously introduce water to maintain the catalyst concentration substantially constant. The organic layer can be distilled to recover acetone and isophorone therefrom and the residue recycled to the reactor. Another method, particularly suited for continuous operation, involves effecting the treatment in a reactor fitted with a stirrer and a fractionating column. This apparatus is used under such pressure conditions that the acetone auto-condensation products being treated are kept in liquid phase, but acetone and water which form an azeotropic mixture at high temperature and pressure, are removed from the reactor as distillate. In this manner, the treatment is effected so that the acetone is removed from the reaction system substantially as fast as formed.

While the process of the invention is suitable for treatment of acetone auto-condensation products consisting of a mixture of xylitone and higher products, which mixture contains a great variety of compounds, it is in some cases more desirable to separately treat such fractions and at times to treat the fractions under different conditions. Thus xylitone which is substantially free of other acetone auto-condensation products can be treated. If desired, a mixture of xylitone and the acetone auto-condensate of the formula $C_{15}H_{22}O$ can be treated or the latter material alone can be treated.

For example, a portion of fraction 3, for which the description has been given hereinbefore with respect to distillation of mixed acetone auto-condensation products into fractions and analysis thereof, was contacted in batchwise fashion with an equal volume of aqueous solution containing 0.95% potassium hydroxide. This fraction, as the analysis indicated, consisted of approximately equivalent amounts of high-boiling xylitone isomer and lower-boiling isomeric ketone or ketones of the formula $C_{15}H_{22}O$. The temperature of treatment was about 200° C. under a pressure of about 240 p. s. i. and was continued for two hours. Dilute hydrochloric acid was added to the reaction mixture to aid the separation into two phases and the formed acetone and isophorone recovered by distillation. The treatment caused hydrolysis into these products to the extent of about 31.5 weight per cent.

We claim as our invention:

1. A process for obtaining isophorone and acetone which comprises contacting in liquid phase acetone auto-condensation products consisting substantially of compounds having higher boiling point than isophorone with an aqueous solution containing 0.5% to 25% by weight of an alkali metal hydroxide at a temperature of 130° C. to 235° C.

2. A process for hydrolysis which comprises contacting in liquid phase acetone auto-condensation products consisting substantially of compounds having higher boiling point than isophorone with a dilute aqueous solution of an alkali metal hydroxide at a temperature of 130° C. to 235° C. for a time sufficient to hydrolyze an appreciable proportion of said compounds to isophorone and acetone.

3. A process which comprises contacting in liquid phase a mixture of acetone auto-condensation products, which mixture contains at least 95% of acetone auto-condensation products of the formula $C_{3n}H_{4n+2}O$ wherein $n$ is an integer of at least 4, with an aqueous solution containing 1% to 10% by weight of an alkali metal hydroxide at a temperature of 170° C. to 220° C. for a time sufficient to hydrolyze an appreciable proportion of said mixture to isophorone and acetone.

4. A process which comprises hydrolyzing acetone auto-condensation products consisting substantially of xylitone in the presence of an aqueous solution containing 0.5% to 25% by weight of an alkali metal hydroxide at a temperature of 130° C. to 235° C. in liquid phase.

5. A process which comprises commingling and hydrolyzing a mixture of acetone auto-condensation products consisting substantially solely of xylitone and compounds of the formula $C_{15}H_{22}O$ with an aqueous solution containing 0.5% to 25% by weight of an alkali metal hydroxide at a temperature of 130° C. to 235° C. in liquid phase whereby isophorone and acetone are produced.

6. In a process for the production of isophorone wherein acetone is subjected to auto-condensation and a mixture of auto-condensation products are obtained which are treated with dilute aqueous alkaline solution to revert the products of lower boiling point than isophorone to acetone which is separated from the reaction mixture so as to obtain a treated mixture substantially consisting of isophorone and products having higher boiling point than isophorone, the improvement which comprises fractionally distilling said treated mixture so as to obtain a fraction consisting substantially of products having higher boiling point than isophorone, and mixing and agitating said fraction in liquid phase with an aqueous solution containing 0.5% to 25% by weight of an alkali metal hydroxide at a temperature of 130° C. to 235° C. for a time sufficient to convert an appreciable proportion of said fraction into isophorone and acetone.

SEAVER A. BALLARD.
VERNON E. HAURY.

REFERENCES CITED

The following references are of record in the file of this patent:

UNITED STATES PATENTS

| Number | Name | Date |
| --- | --- | --- |
| 2,148,103 | Bruson | Feb. 21, 1939 |
| 2,183,127 | Vaughn | Dec. 12, 1939 |